(12) United States Patent
Knight et al.

(10) Patent No.: US 11,392,816 B2
(45) Date of Patent: Jul. 19, 2022

(54) IMPLANTABLE PASSIVE RFID TAG

(71) Applicants: Adrian Knight, Sydney (AU); Paul Donohoe, Warlingham (GB); Matti Hiob, Sydney (AU); Brad D. Pedersen, Hayward, WI (US); Somark Group Pty Ltd, Sydney (AU)

(72) Inventors: Adrian Knight, Sydney (AU); Paul Donohoe, Warlingham (GB); Matti Hiob, Sydney (AU); Brad D. Pedersen, Hayward, WI (US)

(73) Assignee: Somark Group Pty Ltd, Sydney (AU)

(*) Notice: Subject to any disclaimer, the term of this patent is extended or adjusted under 35 U.S.C. 154(b) by 0 days.

(21) Appl. No.: 17/606,692

(22) PCT Filed: Apr. 27, 2020

(86) PCT No.: PCT/US2020/030138
§ 371 (c)(1),
(2) Date: Oct. 26, 2021

(87) PCT Pub. No.: WO2020/220043
PCT Pub. Date: Oct. 29, 2020

(65) Prior Publication Data
US 2022/0147788 A1     May 12, 2022

Related U.S. Application Data

(60) Provisional application No. 62/839,106, filed on Apr. 26, 2019.

(51) Int. Cl.
*G06K 19/077* (2006.01)
*A01K 11/00* (2006.01)
(Continued)

(52) U.S. Cl.
CPC ...... *G06K 19/07786* (2013.01); *A01K 11/006* (2013.01); *G06K 19/07758* (2013.01); *H01Q 1/2283* (2013.01); *H01Q 9/265* (2013.01)

(58) Field of Classification Search
CPC ..... G06K 19/007758; G06K 19/07786; A01K 11/006; H01Q 1/2283; H01Q 9/265
See application file for complete search history.

(56) References Cited

U.S. PATENT DOCUMENTS

| 2004/0032377 | A1* | 2/2004 | Forster | G06K 19/07786 343/793 |
| 2008/0042849 | A1* | 2/2008 | Saito | G06K 19/07718 604/272 |

(Continued)

OTHER PUBLICATIONS

PCT International Search Report for PCT/US2020/030138, dated Aug. 7, 2020, 4 pages.

(Continued)

*Primary Examiner* — Andrea Lindgren Baltzell
*Assistant Examiner* — Amal Patel
(74) *Attorney, Agent, or Firm* — Patterson Thuente Pedersen, P.A.

(57) ABSTRACT

An improved passive RFID tag configured for needle implantation in a tail of a rodent using a small diameter needle provides for increased read distances and effectiveness. In various embodiments, the RFID tag is comprised of an elongated flexible substrate having a pair of opposed surfaces with a UHF RFID chip positioned on a first of the opposed surfaces and is directly electrically connected to a closed-loop multi-layer folded dipole antenna disposed on both of the opposed surfaces of the substrate. An antenna is electrically connected to the RFID chip and includes at least an inductor as part of the closed-loop antenna. In embodi- (Continued)

ments, the RFID tag can be read with at least 90 percent effectiveness by a 30 dB RFID tag reader at least 5 cm from a tail of the rodent.

15 Claims, 19 Drawing Sheets

(51) Int. Cl.
*H01Q 9/26* (2006.01)
*H01Q 1/22* (2006.01)

(56) References Cited

U.S. PATENT DOCUMENTS

| | | |
|---|---|---|
| 2012/0086620 A1 | 4/2012 | Johnson |
| 2017/0170850 A1* | 6/2017 | Deng ................. H04B 1/034 |
| 2019/0053465 A1* | 2/2019 | Knight ................ A61D 7/00 |

OTHER PUBLICATIONS

PCT Written Opinion of the ISA for PCT/US2020/030138, dated Aug. 7, 2020, 6 pages.

* cited by examiner

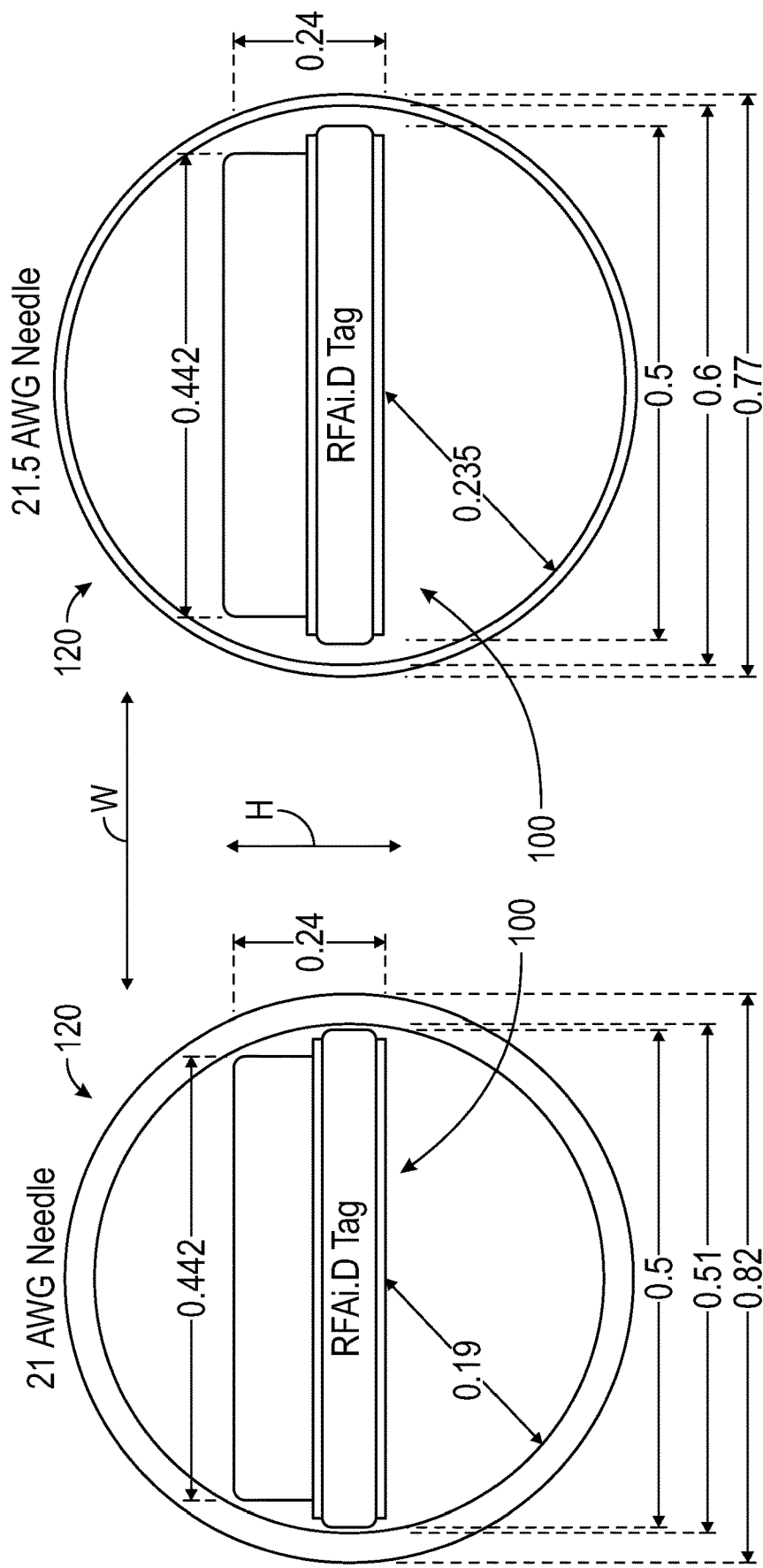

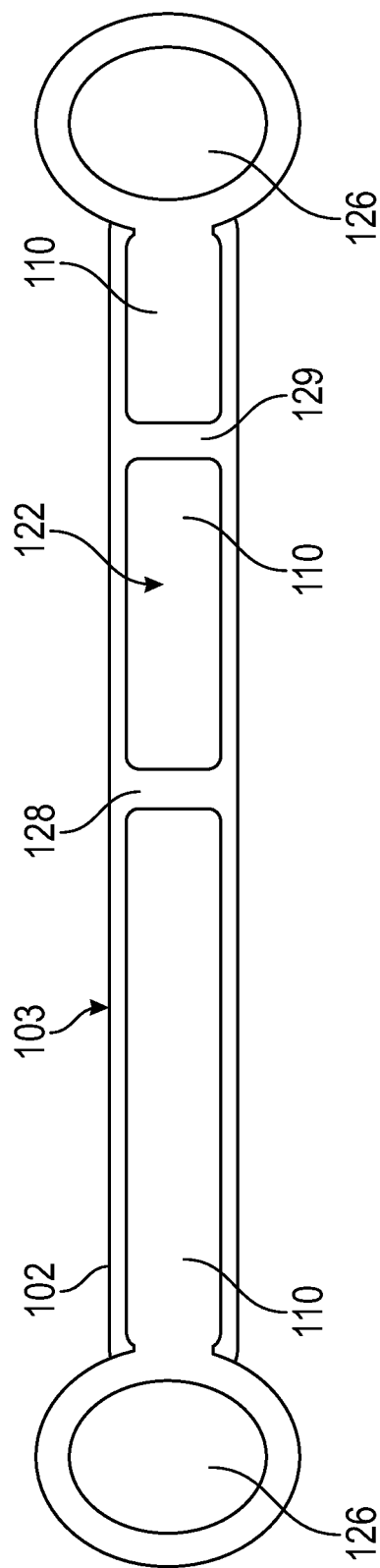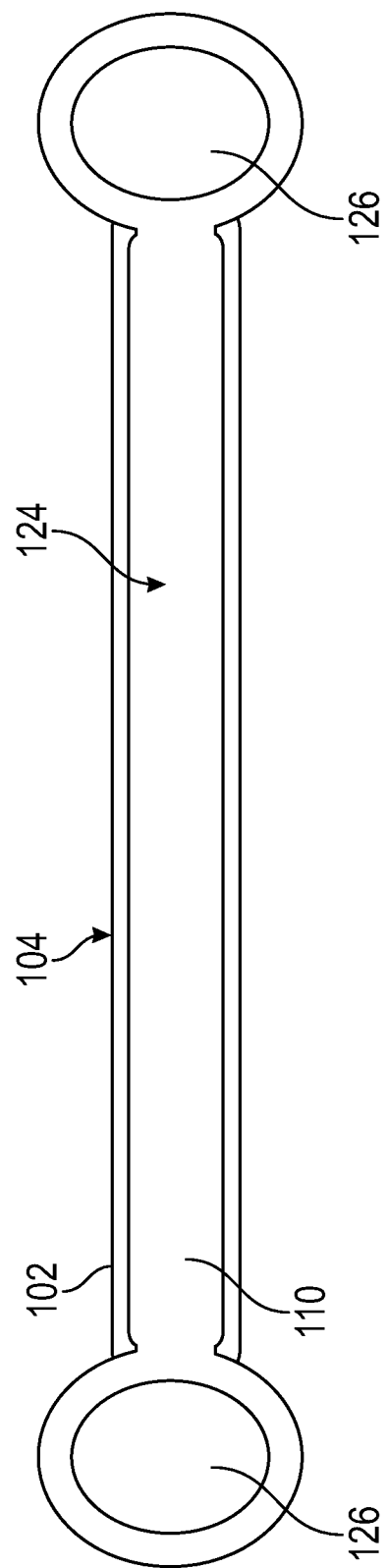
FIG. 3A
FIG. 3B

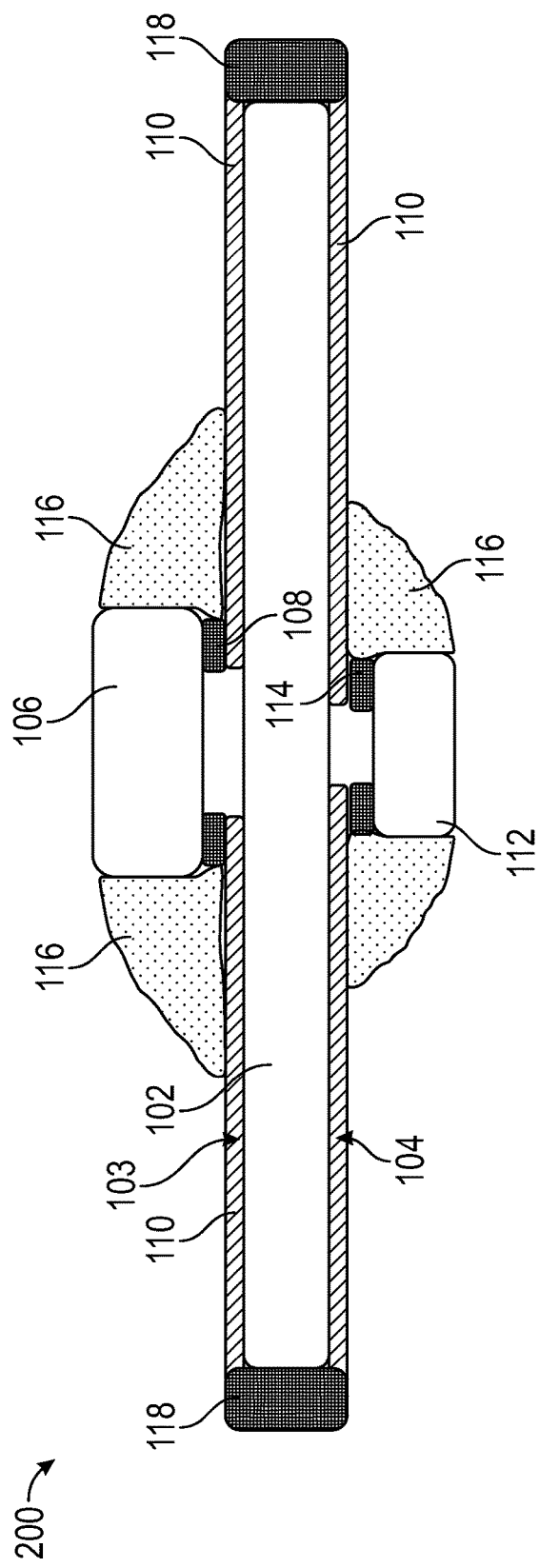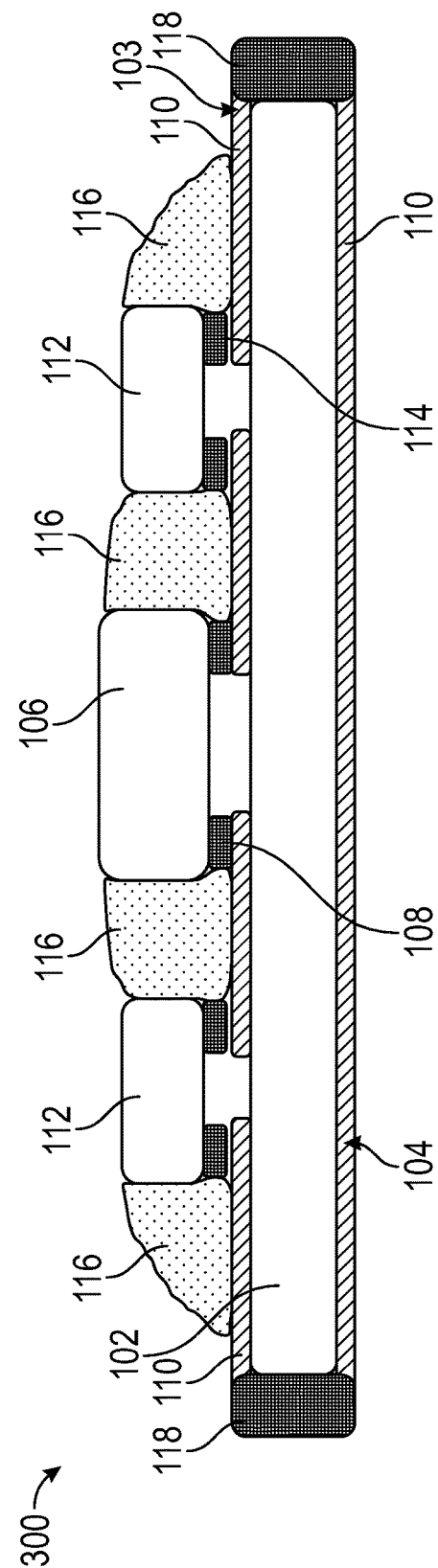

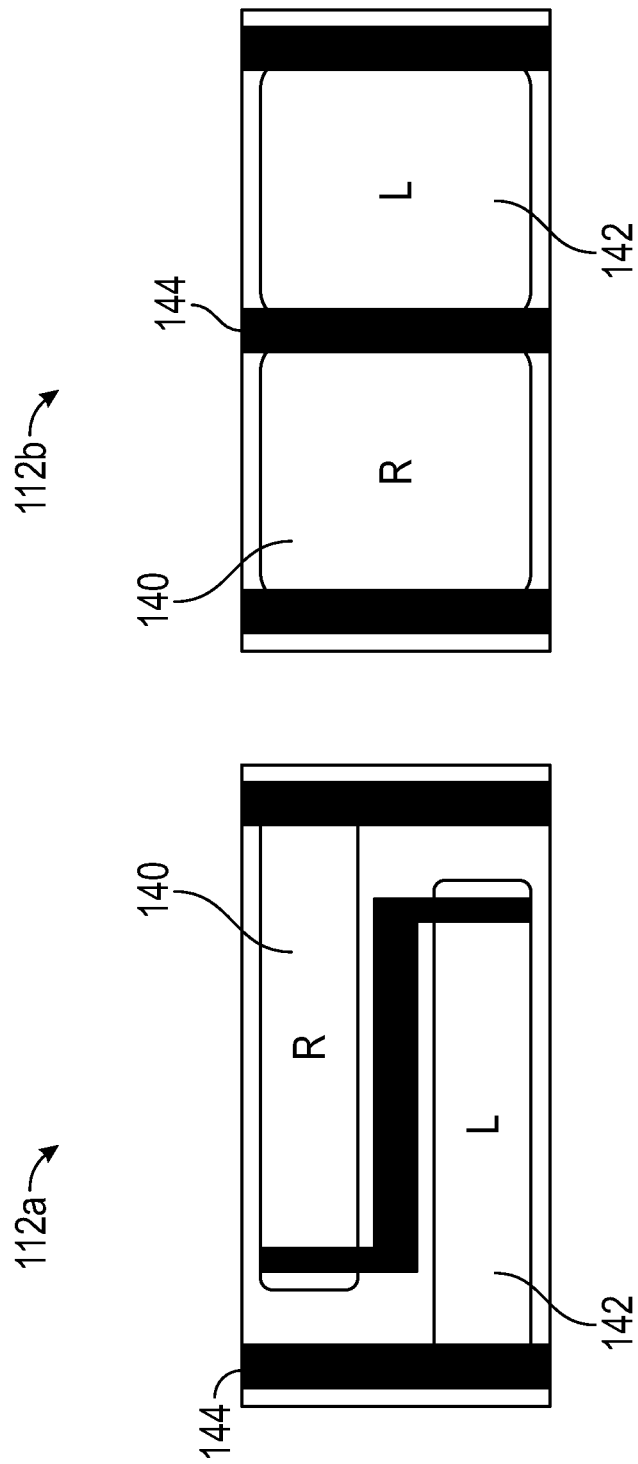

IMPLANTABLE PASSIVE RFID TAG

RELATED APPLICATIONS

The present application is a National Phase entry of PCT Application No. PCT/EP2020/030138, filed Apr. 27, 2020, which claims priority from U.S. Application No. 62/839,106, filed Apr. 26, 2019, each of which is hereby fully incorporated herein by reference.

FIELD OF THE INVENTION

The present disclosure relates generally to radio frequency identification (RFID) animal marking/tracking implants. More particularly, the present disclosure relates to an improved ultra-high frequency (UHF) passive RFID tag configured for implantation in a tail of a rodent that provides for increased effectiveness.

BACKGROUND OF THE INVENTION

Animal research and experimentation benefits from accurate identification and monitoring of each of a plurality of animals. Animal research involving rodents, such as mice or rats, has increased with the advent of genetically engineered strains of these test animals.

A passive radio-frequency identification (RFID) tag may be used to mark/identify an animal. RFID tags are designed to be small to reduce discomfort to the animal. Passive RFID tags are powered by an externally generated electromagnetic wave in the form of an interrogation radio wave. RFID tags have a radio receiver for receiving the interrogation radio wave and a radio transmitter for transmitting a radio wave comprising identification information in response to the received interrogation radio wave.

Most implantable passive RFID tags for animals are in the form of a rigid capsule of a non-conductive material like glass. Examples of these kinds of animal implantable passive RFID tags are shown in U.S. Pat. Nos. 4,262,632, 5,211,129, and 6,974,004, and U.S. Publ. No. US2008/0042849 A1. Unfortunately, both the size and rigid nature of these kinds of passive RFID tags in a capsule make implantation difficult, painful, and ineffective in rodents.

A solution to these problems is provided by the microelectronic animal identification tags developed by the assignee of the present disclosure that are marketed as the Digitail™ tag (www.mysensalab.com/products/digitail-tag/), various aspects of which are described in U.S. Publ. No. US2016/0037749 A1 and PCT Publ. No. WO2017/136898 A1. Although these relatively flexible UHF RFID tags are one of the smallest implantable passive RFID tags available, the read distances of these RFID tags can be limited by the small dimensions required for needle-implantation of these RFID tag.

The maximum distance that a passive RFID tag may be read is dependent on the frequency of the radio wave, the medium through with the radio wave is propagated, the power of the interrogation radio wave, and the size and design of the RFID tag antenna. The power of the interrogation radio wave is typically limited by regulation in the context of animal research and experimentation to about 30 dB. Conventional approaches to RFID antenna design as described in *RFID Tag Antenna Design*, IMPINJ Whitepaper Ver. 1.0 (2017) (available at https://support.impinj.com/hc/article_attachments/360000130460/TagAntennaDesignOverview-20170606.pdf) can include increasing the size of the antenna by increasing the length of a meander type antenna or modifying the inductive loop that couples the antenna to the RFID chip.

In the context of the significant size constraints imposed for needle-implantation of the RFID tag in a rodent, together with the complex characteristics of the living tissue through which the radio waves are propagated, conventional solutions to improve antenna design or increase power in order to improve read effectiveness of the RFID tag are neither practical nor predictable. Accordingly, there is an opportunity to improve on the design of this kind of relatively flexible, implantable passive UHF RFID tag in terms of improved read effectiveness.

SUMMARY OF THE INVENTION

A passive UHF RFID tag configured for implantation in a tail of a rodent using a small diameter (20-22 AWG) needle in accordance with embodiments as disclosed provides for increased read effectiveness. In various embodiments, the passive UHF RFID tag is comprised of an elongated flexible substrate having a pair of opposed surfaces with a RFID chip positioned on a first of the opposed surfaces. The RFID chip is directly electrically connected to a closed-loop multi-layer folded dipole antenna that is disposed on both of the opposed surfaces of the substrate. The antenna is electrically connected to the RFID chip and includes at least an inductor as part of the closed-loop antenna. With a biocompatible insulative coating having a maximum thickness of 25 μm, the passive UHF RFID tag can have maximum dimensions of 1 mm wide, 0.6 mm high, and 10 mm long that are suitable for needle implantation in a tail of a rodent. In embodiments, the RFID tag can be read with at least 90 percent effectiveness by a 30 dB RFID tag reader at least 5 cm from a tail of the rodent.

In embodiments, the inductor is one component of an antenna matching circuit that is electrically part of the closed-loop antenna and has an equivalent inductance of 5-50 nH and an equivalent resistance of less than 50 ohms. In some embodiments, the component(s) of the antenna matching circuit are provided in a surface mount device (SMD) that is physically mounted on a same surface of the substrate as the RFID chip. In other embodiments, the SMD is physically mounted on a surface of the substrate opposite the surface of the substrate on which the RFID chip is mounted. In some embodiments, all of the components of the antenna matching circuit are electrically connected to the closed-loop antenna location at one gap between portions of the closed-loop antenna. In some embodiments, different components of the antenna matching circuit are electrically connected to the closed-loop antenna at different gaps on the same or opposite surfaces of the pair of opposed surfaces of the substrate.

In embodiments, the closed-loop multi-layer folded dipole antenna is formed of a layer of non-ferrous conductive material, such as copper or silver, deposited on each of the pair of opposed surfaces. In some embodiments, each conductive layer covers substantially all of an exposed portion of the opposed surface other than a first gap for mounting the RFID chip and at least a second gap for mounting the inductor with an end opposite the first gap on each of each conductive layer on each of the opposed surfaces being soldered together and terminated to form one of a pair of opposed ends of the strip that provides an electrical connection between the conductive layers on the pair opposed surfaces. In other embodiments, each conductive layer may include at least one strip that does not extend substantially across the opposed surface from one side to another side. In some embodiments, the at least one strip of conductive material is configured as a split antenna portion on at least one of the opposed surfaces. In some embodiments, the at least one strip of conductive material is configured as a meander antenna portion on a least one of the opposed surfaces.

In embodiments, the elongated flexible substrate is a strip of polyimide material having a maximum thickness of 100 µm and a dielectric constant in the range of 2.75-3.5. In some embodiments, the RFID chip is secured to the first of the opposed surfaces by a pair of solder pads under the RFID chip and an ultraviolet adhesive on top of at least a portion of the RFID chip. In some embodiments, the elongated flexible substrate of the RFID tag is configured to form a curved arc between the pair of opposed ends of the substrate up to a 45-degree arc angle with less than a ten percent failure rate of the RFID tag.

BRIEF DESCRIPTION OF THE DRAWINGS

FIGS. 2A and 2B illustrate a lengthwise mid-point cross-sectional view of an RFID tag positioned within a 21 AWG needle and a 21.5 AWG needle, respectively.

FIGS. 3A and 3B illustrate a top and bottom view, respectively, of an embodiment of a flexible substrate for an RFID tag of FIG. 1B with the closed-loop multi-layer folded dipole antenna prior printed on the substrate prior to laser cutting and mounting of the RFID chip and matching circuit.

FIG. 5A illustrates a cross-sectional side view of an embodiment of an RFID tag with a closed-loop multi-layer folded dipole, an RFID chip on a first surface of the RFID tag substrate and a matching circuit on a second surface of the RFID tag substrate.

FIG. 5B illustrates a cross-sectional side view of an embodiment of an RFID tag with a closed-loop multi-layer folded dipole, an RFID chip on a first surface of the RFID tag substrate and a pair of inductors on the first surface of the RFID tag substrate.

FIGS. 8A and 8B illustrate example embodiments of SMD chips incorporating the components of matching circuits.

DETAILED DESCRIPTION OF THE EMBODIMENTS

Disclosed herein is an improved passive RFID tag configured for needle implantation in a tail of a rodent. Embodiments disclosed herein provide for increased read distances and identification effectiveness. In various embodiments, an RFID tag includes an elongated flexible substrate having a pair of opposed major surfaces: a first surface and a second surface. An RFID chip configured to operate in the ultra-high frequency (UHF) range is mounted on the first surface. The RFID chip is directly electrically connected to a closed-loop multi-layer folded dipole antenna that is disposed on both of the opposed surfaces of the substrate. In various embodiments, RFID tag also includes one or more matching circuits arranged on one or both of the opposed surfaces that include at least an inductor.

Figure 1A:
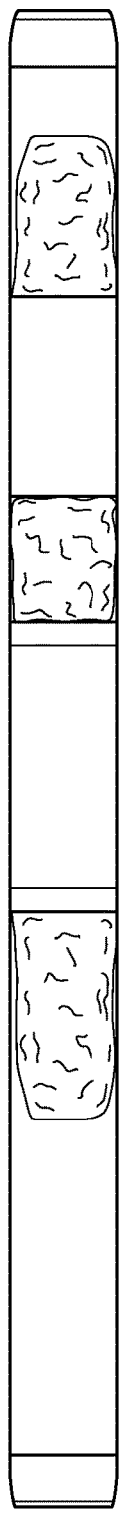
FIG. 1A illustrates a photographic view of an RFID tag in accordance with an embodiment.
Figure 1B:
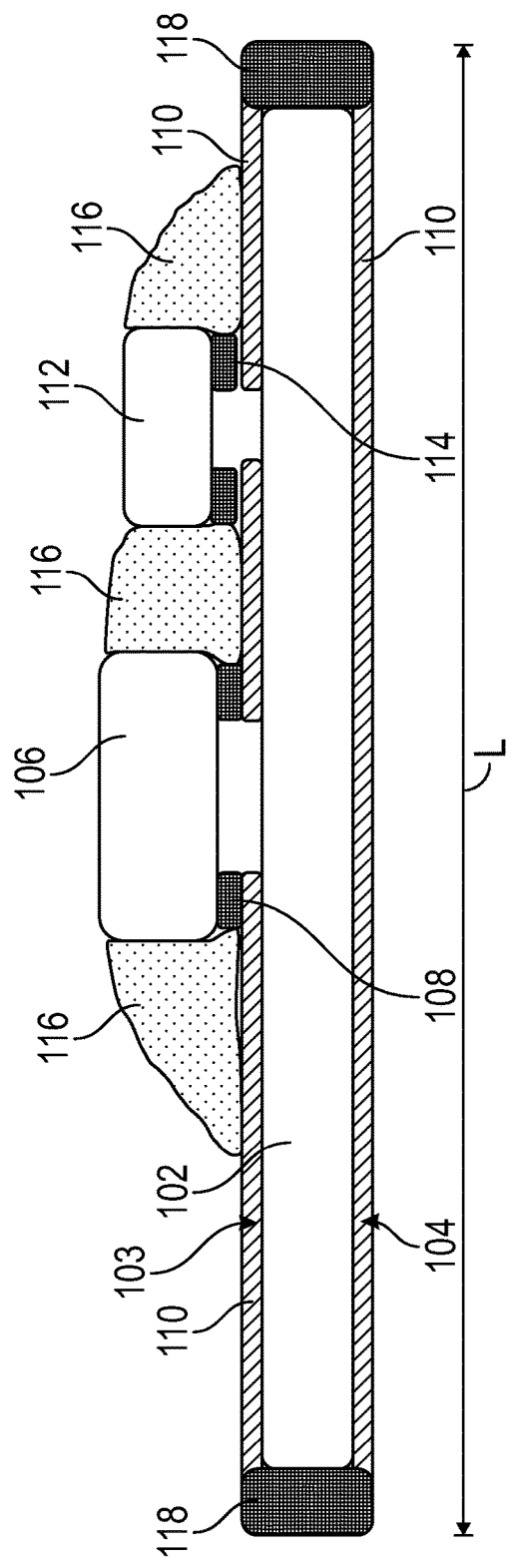
FIG. 1B illustrates a cross-sectional side view of an embodiment of RFID tag similar to FIG. 1A.

As shown in FIG. 1A and FIG. 1B, embodiments of an RFID tag 100 include an elongated flexible substrate 102 having a pair of opposed major surfaces: a first surface 103 and a second surface 104. An RFID chip 106 is mounted on the first surface 103. The RFID chip 106 is directly electrically connected by a pair of solder pad joints 108 to a closed-loop multi-layer folded dipole antenna 110 that is disposed on both of the opposed surfaces 103, 104 of substrate 102. Flexible substrate 102 provides a dielectric support structure for RFID chip 106 and antenna 110.

RFID tag 100 also includes a matching circuit 112 including at least an inductor electrically coupled in series with the antenna 110. In FIG. 1A, matching circuit 112 is a single discrete inductor component that is directly soldered to antenna 110. In FIG. 1B, matching circuit 112 is a surface mount device (SMD) component having an inductive element and a resistive element and is electrically connected to antenna 110 by a pair of solder pad joints 114.

In embodiments, RFID tag 100 is coated with a biocompatible insulative coating (not shown) having a maximum thickness of 25 µm covering the RFID tag 100. The coating should be thick enough to provide a barrier for enhancing biocompatibility of the RFID tag 100 and also provide an insulation barrier for the antenna 110. In embodiments, the coating is a parylene C coating that is applied by a tumble coating process to the completed tag. In other embodiments, the coating is a silicon or similar biocompatible coating that is sprayed onto RFID tag 100 once the tag is assembled.

In embodiments, RFID chip 106 and matching circuit 112 are further secured to the RFID tag 100 by the use of a bioinert adhesive or potting material 116, such as an ultraviolet light curable adhesive available from Dymax. In addition to providing further structural integrity, the use of an adhesive material 116 can also reduce the exposed edges of RFID chip 106 and SMD matching circuit chip 112 to provide a more tapered or smoother interface between the exterior of the RFID tag 100 and the tissue in the rodent tail. This can reduce abrasion, adhesions, inflammation, and infection that might otherwise be initiated as a physiological reaction to the needle implantation of the RFID tag 100.

Flexible substrate 102 can comprise a dielectric polyimide material, such as Kapton™ by DuPont. In embodiments, flexible substrate 102 has a maximum thickness of 100 μm and a dielectric constant in the range of 2.75-3.5. Flexible substrate 102 includes a first major surface 103 arranged on what may be referred to as a top or upper portion of flexible substrate 102. As depicted in FIG. 1B, flexible substrate 102 also includes a second major surface 104 arranged on what may be referred to as a bottom or lower portion of flexible substrate 102 such that first surface 103 is opposite second surface 104. In embodiments, at each end of the length dimension of flexible substrate 102, an upper portion of antenna 110 and a lower portion of antenna 110 are electrically connected by soldered ends 118.

In embodiments, flexible substrate 102 is configured to have a length L of between 4-10 mm. Length L may be determined based on a variety of factors. For example, one parameter of length L may be the intended RFID transmission wavelength, such that an effective length of the antenna 110 is close to a whole fraction of the intended RFID transmission wavelength. In embodiments, the effective length may be adjusted based on the changes in wavelength of the signal propagating through the tissue of the rodent because that wavelength is smaller than that of the same signal travelling in free space. In embodiments, the dimensions of the antenna 100, including the length and width are configured to more closely match a resonant frequency/wavelength fraction of this reduced wavelength in order to increase the read range.

Another parameter of length L may be the type of animal that RFID tag 100 is intended to be implanted. For example, smaller rodents, such as mice, have typical tail lengths that are more readily suited for RFID tags 100 having a length L of around 4-6 mm. In larger rodents, such as rats, the length L of RFID tag may be up to 10-12 mm. Increasing the length L can result in some improvements in the read strength and read effectiveness of the RFID tag 100 but can also impact the ease and effectiveness of needle implantation as well as the structural viability and integrity of the RFID tag 100.

In embodiments, a parameter of length L may include whether the length for a given flexibility of the RFID tag 100 interferes with the ability of the animal to curve the portion of its tail into which the RFID tag 100 is implanted without impacting the structural or electrical integrity of the RFID tag 100. In embodiments, the elongated flexible substrate 102 is configured to form a curved arc between the pair of opposed ends of the substrate 102 that can be up to a curve defining a 45 degree arc angle without producing more than a ten percent failure rate of the RFID tags 100 during a representative sample of initial flat bend testing (without rotational flex) after manufacture. In embodiments, the flexibility and structural integrity of the RFID tag 100 are influenced by the material and thickness of the substrate 102, the material and thickness of each layer of the antenna 100, the size of the solder pads 114 and formulation of the corresponding solder used, and the size of the RFID chip 106 and SMD matching circuit 112.

In various embodiments, RFID chip 106 is a passive-type RFID chip that does not include a battery. RFID chip 106 includes an integrated circuit and a transceiver for receiving and transmitting a UHF signal. Example of a suitable RFID chip 106 include the Monza™ RP-6 by Impinj and the Higgs EC IC by Alien, although other suitable passive RFID chips can be used.

The integrated circuit of RFID chip 106 is powered by the incoming UHF signal and thus the UHF signal is transmitted at a power-transmission power level, as opposed to signal-only power level. Due to radio frequency power transmission regulations in the United States and Europe, power-transmission level power is limited to 30 decibels for human exposure and 33 decibels for non-human exposure. For passive RFID chips configured for UHF bandwidths, these power transmission limitations can otherwise limit the overall amount of power that can be transferred to the RFID chip 106. This limitation is one reason why lower frequency systems have been used in conventional animal RFID tag implants; however, lower frequency systems are inherently limited in the read rate for reading and distinguishing among different RFID tags in a common area.

In embodiments, matching circuit 110 can comprise a variety of passive matching components such as resistors, inductors, and capacitors. When RFID chip 106 and antenna 110 are assembled to form RFID tag 100, there is a resultant complex impedance. Matching circuit 110 is configured to match the resultant complex impedance of RFID chip 106 and antenna 110, together with any additional impedance, capacitance or inductance values that may be introduced by the inductor(s) or SMD chip(s) for matching circuit 110 and the solder joints for solder pads 108 and 114, as well as soldered ends 118. In embodiments, the values for matching circuit 110 are selected to maximize the power transfer of reception/transmission for the particular passive RFID chip 106 such that a read distance between a reader (not shown) and the RFID tag 100 as implanted in the rodent tail is optimized as described in further detail below.

In various embodiments, antenna 110 is arranged in a closed-loop, folded dipole antenna configuration. Antenna 110 includes a lower portion arranged on second surface 104 and an upper portion arranged on first surface 103. Antenna 110 may comprise printable copper layers or layers formed of other printable or depositable electrically conductive materials. In embodiments, antenna 110 is not formed of any ferrous metals such that RFID tag 100 is magnetic resonance imaging (MRI) compatible.

In embodiments, antenna 110 creates a closed-loop, folded dipole antenna configuration by coupling the lower portion of antenna 110 to the upper portion of antenna 110 at each end of substrate 102 via solder joints 118. In this way, antenna 110 effectively wraps around flexible substrate 102 lengthwise.

In other embodiments, antenna 110 may form a single continuous printed band of conductive material that covers both the upper surface 104 and lower surface 103 of flexible substrate 102 other than gaps between the solder pads 108 and 114. In this embodiment, the antenna 110 may be adhered to the flexible substrate 102 or may be deposited onto the flexible substrate 102 by vapor deposition or the like.

Referring to FIG. 2A and FIG. 2B, RFID tag 100 is configured for implantation in a tail of a rodent by use of a needle 120. Needle 120 is configured for loading and delivery of the RFID tag 100. In embodiments, needle 120 can include a 20-22 AWG gauge needle with a relatively small diameter lumen. In embodiments, needle 120 has a thin-walled tubular or cannula like structure that facilitates an increased inner diameter relative to the desired outer diameter optimized for needle insertion of the RFID tag 100 without the need to use sutures, glue or the like to close the opening in the skin made by needle 102. In embodiments, a thickness of the tubular wall of needle 120 has dimensions ranging from 0.1-0.5 mm.

As shown by the various dimensions in mm in FIG. 2A and FIG. 2B, RFID tag 100 is sized and shaped to be delivered via a relatively small diameter lumen of needle 120. In embodiments, flexible substrate 102, RFID chip 106, antenna 110, and matching circuit 112 have a total combined width of the RFID tag 100 of less than 1 mm and a total combined height of RFID tag 100, which includes the stacked thicknesses of flexible substrate 106, RFID chip 108 or matching circuit 110, and two thicknesses of antenna 112, is less than 0.6 mm.

FIGS. 3A and 3B depict a top and bottom view, respectively, of an embodiment of the closed-loop multi-layer folded dipole antenna 110 for an RFID tag 100 as shown in FIG. 1B. These figures show an upper layer 122 and a lower layer 124 closed-loop multi-layer folded dipole antenna 110 printed on the flexible substrate 102 prior to laser cutting and mounting of the RFID chip 106 and matching circuit 112. In embodiments, upper layer 122 of antenna 110 is printed onto flexible substrate 102 on first upper surface 103 as depicted in FIG. 3A, and lower layer 124 is printed on second lower surface 104, as depicted in FIG. 3B. In various embodiments, an array of multiple antenna blanks for RFID tags 100 are printed on both sides of a single sheet of the flexible substrate 102 with each being laser cut from the sheet to form an individual RFID tag 100.

In embodiments, antenna 110 includes a pair of ring structures 126, each ring formed at one of the longitudinal ends of upper layer 122 and lower layer 124. In embodiments, the corresponding pairs of rings 126 at each longitudinal end of the antenna layers 122, 124 are used to define a vertical interconnected access (via) aperture in flexible substrate 106. After upper portion and lower portion of antenna 112 have been printed onto first surface 113 and second surface 114, respectively, a via aperture is created between corresponding rings 126 and the via aperture are configured to receive solder to form a thru-connect between the corresponding layers of the rings 126 at each longitudinal end of antenna 110. In other embodiments, the vias may be formed at locations other than the longitudinal ends of the antenna 110, for example, as smaller thru-vias completely surrounded by portions of the flexible substrate 102.

In embodiments, a flow soldering step electrically couples upper antenna layer 122 and lower antenna layer 124 by solder within the rings 126. In embodiments, the flow solder step can occur as a single process after the RFID chip 106 and matching circuit 112, such as an SMD chip, are mounted on the corresponding solder pads 108, 114. In other embodiments, the flow solder step can occur as a multi-step process. Once soldering is completed, the solder ends 118 are formed by cutting away and/or mechanically or thermally removing any excess solder and corresponding portion of the rings 126 to form the corresponding longitudinal ends of RFID tag 100 where antenna 110 wraps between the upper surface 103 and the lower surface 104 of flexible substrate 102. In embodiments, solder ends 118 may be finished, polished, coated, or layered over to form relatively smoother end structures that have a rounded, tapered or graduated height and width smaller than the portion of the RFID tag 100 where RFID chip 106 is located.

In embodiments, at least one of upper antenna layer 122 and lower antenna layer 124 are printed so as to include an RFID chip gap 128 and one or more matching circuit gaps 129. RFID chip gap 128 and the one or more matching circuit gaps 129 are printed to allow RFID chip 106 and one or more matching circuits 112 to be soldered into a portion of the closed-loop multi-layer dipole antenna 110.

Figure 4C:
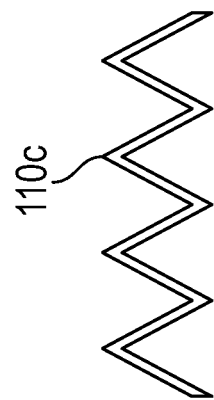
FIGS. 4A, 4B, and 4C illustrate configurations of an antenna layer of the closed-loop multi-layer folded dipole antenna in different embodiments.
Figure 4B:
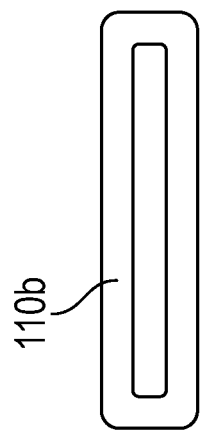
Figure 4A:
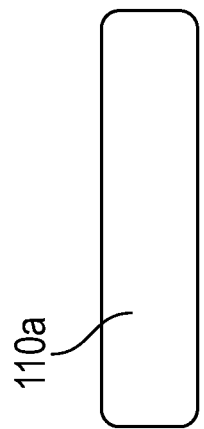

Various embodiments of the antenna layers 122, 124 of antenna 110, as depicted in FIGS. 4A-4C, can also be used to vary the RFID system frequency used, or to enhance read distance. It will be understood that various combinations of these antenna layer designs may be used for all of part of one or both of the antenna layers 122, 124 of antenna 110.

FIG. 4A depicts an embodiment of the RFID tag 100 of FIG. 1B having a layer 122, 124 of antenna 110a comprises a solid width of copper or conductive material that is substantially equal to a width of substrate 102. This embodiment can be printed on substrate 102 and provides ample surface area for connecting to solder pads 108, 114.

FIG. 4B depicts an embodiment of in which a layer of antenna 112b comprising a split antenna design having two strips of copper or conductive material separated by a central channel. The central channel creates portions of antenna 112b having two conduits, instead of one. As antenna 112b includes two conduits in some portions, the effective length of antenna 112b may be increased without increasing the actual physical length of RFID tag 100 due to a resonating effect of the two parallel conduits.

FIG. 4C depicts an embodiment of in which a layer 122, 124 of antenna 112c comprises a relatively thin, meandering strip of copper or conductive material conduit. The meandering conduit of antenna 112c may increase the antenna length without increasing the actual physical length of RFID tag 100.

Matching circuits 110 can be arranged in a variety of different physical arrangements on the different surfaces, as well as different variations of circuit components.

As depicted in FIG. 5A, an embodiment of RFID tag 200, includes matching circuit 110 arranged on second surface 104, instead of first surface 103. In this embodiment, matching circuit 110 is arranged such that it bisects antenna lower layer 124 on the lower, second surface 104. In embodiments, adhesive material 116 is applied as generally indicated on one or both of the first surface 103 and second surface 104 as shown in FIG. 4A.

As depicted in FIG. 5B, an embodiment of RFID tag 300, includes a pair of matching circuits 110 arranged on first surface 103. In embodiments, the matching circuits 110 are positioned symmetrically about the RFID chip 106. In embodiments, adhesive material 116 is applied as generally indicated on the first surface 103 in FIG. 4B, with no adhesive material needed on the second surface 104. In embodiments, the corresponding matching circuit gaps 129 in the upper layer 122 of antenna 110 may be arranged to further facilitate the flexibility of the RFID tag.

Figure 6:
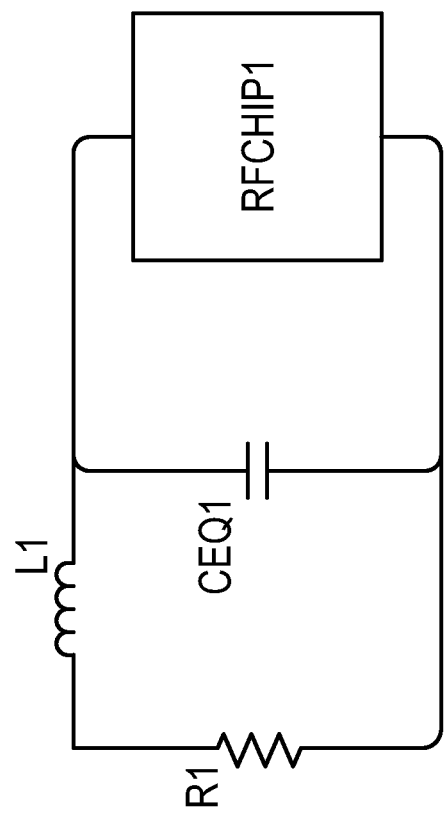
FIG. 6 illustrates an idealized electrical schematic of an embodiment of an antenna matching circuit.

FIG. 6 illustrates an idealized electrical schematic for a matching circuit 112 in accordance with various embodiment. The Thevenin equivalent for the matching circuit can includes an inductor L1, resistor R1 and equivalent capacitance CEQ1 that represents the net capacitance of the physical and electrical configuration of the various components and connections for RFID tag 100. The matching circuit 112 is configured to match the complex impedance of RFID chip 106 (RFchip1) and antenna 110. Inductor L1 includes the equivalent inductance of the matching circuit as well as any residual inductance created by antenna 110. Resistor R1 includes the equivalent resistance of the matching circuit 112, as well as any residual resistance created by antenna 110. Likewise, capacitance CEQ1 includes the equivalent capacitance of the matching circuit 112, as well as any residual capacitance created by antenna 110. Matching circuit 112, as it is shown in FIG. 6 is configured to optimally match the complex impedance of RFID chip 106 and antenna 110 such that power transfer is optimized. Due to various cost and manufacturing limitations, matching circuits for RFID tag 100 can be varied and still achieve significant power transfer optimization.

In embodiments, the antenna 110 should have an impedance that matches the conjugate of the impedance calculated from the circuit model in FIG. 6 where the values of parameters are provided in the datasheet of the RFID chip 106.

$$Cmount=0.21 \text{ pF}, Cp=1.23 \text{ pF}, Rp=1.2 \text{ k}\Omega \quad \text{Eq. 1}$$

In this example, the impedance of the antenna expected by the chip is calculated considering the frequency of operation is at 915 Mhz, which is the center frequency of the US ISM UHF band. Because the capacitors in this configuration are in parallel, $$Ctotal=Cp+Cmount \quad \text{Eq. 2}$$

Considering the angular frequency and capacitive reactance, the imaginary resistance component is determined as $$=1.44 \text{ pF}\omega=2\pi f\,\omega=2\times\pi\times915\times10^6=5749114556.069$$
$$\text{rad/s} Xc={}^1\!/j\omega C \text{ total}={}^1\!-\!125749114556.069\times$$
$$1.44\times10\times j=-120.7915j\Omega \quad \text{Eq. 3}$$

Thus, the Resistance, $$X_R=Rp=1.2 \text{ k}\Omega 1=1+1ZX_R X_{C_Z}=X_R Xc$$
$$X_R+Xc=12.03687-119.5799j\Omega \quad \text{Eq. 4}$$

Therefore, the equivalent theoretical impedance at the chip is 12.03687−119.5799j Ω where, in order to match the chip impedance, the antenna must satisfy an impedance equivalent of the total equivalent impedance, which is inductive. The antenna resistance, and the antenna inductance, $$R_A L_A = X_R = 12.03687\Omega = X_L \quad \text{Eq. 5}$$
$$\omega = 119.5799\ 5749114556.069$$
$$12.03687 + 119.5799j\Omega - equ.\ (1) = 20.8\ nH$$

Thus, the matching circuit 112 can be configured to generally match the inductive reactance (see attached calculation) required by the chip calculated above, by using an inductor with an inductance of 20 nH.

Figure 7A:
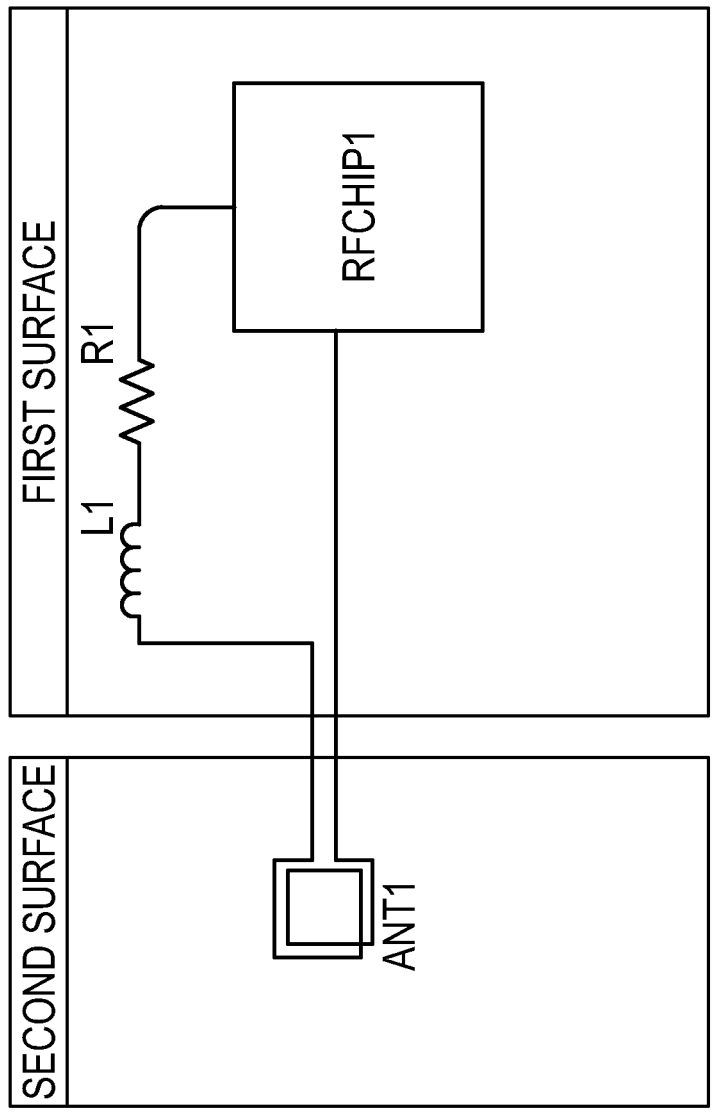
FIG. 7A illustrates an electrical schematic of an embodiment of an RFID tag with a closed-loop multi-layer folded dipole, an RFID chip on a first surface of the RFID tag substrate and a matching circuit on the first surface of the RFID tag substrate.

For example, as depicted in FIG. 7A, a matching circuit 112 can include an inductor L1 and a resistor R1 mounted on first surface 103. FIG. 7A is an equivalent circuit diagram to the physical embodiment of RFID tag 100 depicted in FIG. 1B. In this embodiment, inductor L1 and resistor R1 are configured to match the equivalent impedance of RFID chip 106 and antenna 110. In one example, inductor L1 can have an inductance of about 20 nH and resistor R1 can have a resistance of about 12Ω.

Figure 7B:
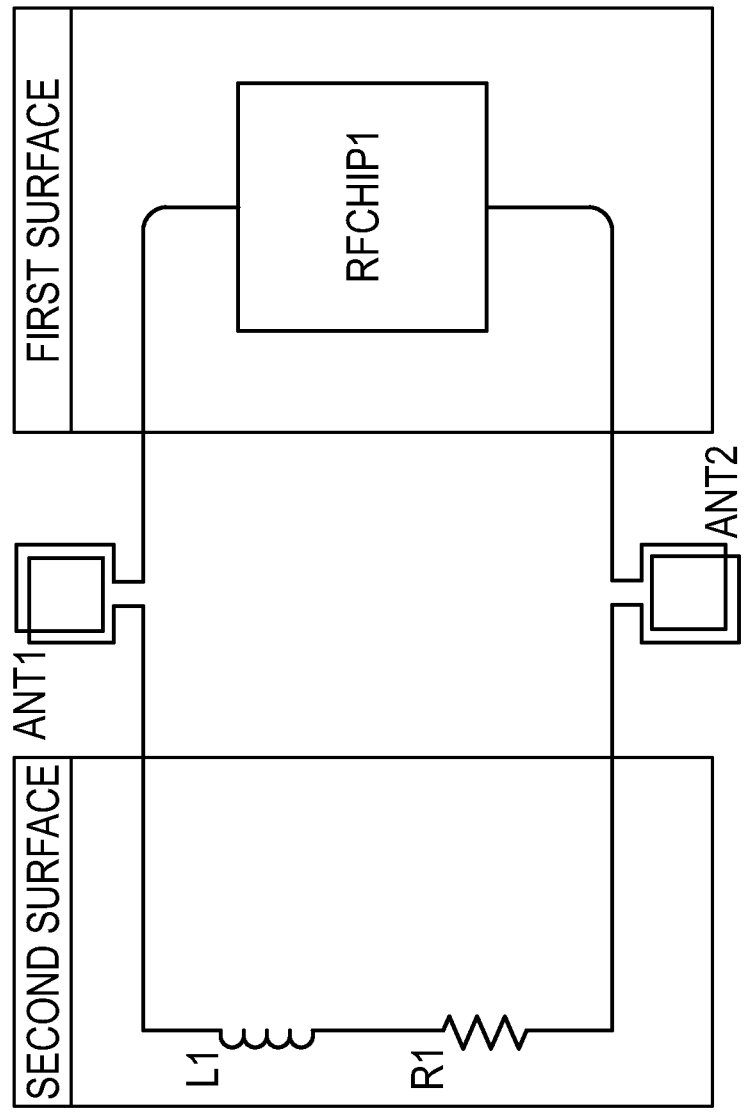
FIG. 7B illustrates an electrical schematic of an embodiment of an RFID tag with a closed-loop multi-layer folded dipole, an RFID chip on a first surface of the RFID tag substrate and a matching circuit on a second surface of the RFID tag substrate.

In an alternative example, as depicted in FIG. 7B, a matching circuit 112 can include an inductor L1 and an optional resistor R1 mounted on second surface 104. FIG. 7B is an equivalent circuit diagram to the physical embodiment of RFID tag 200 depicted in FIG. 5A. In this embodiment, inductor L1 and resistor R1 are configured to match the equivalent impedance of RFID chip 106 and antenna 110 of RFID tag 200.

Figure 7C:
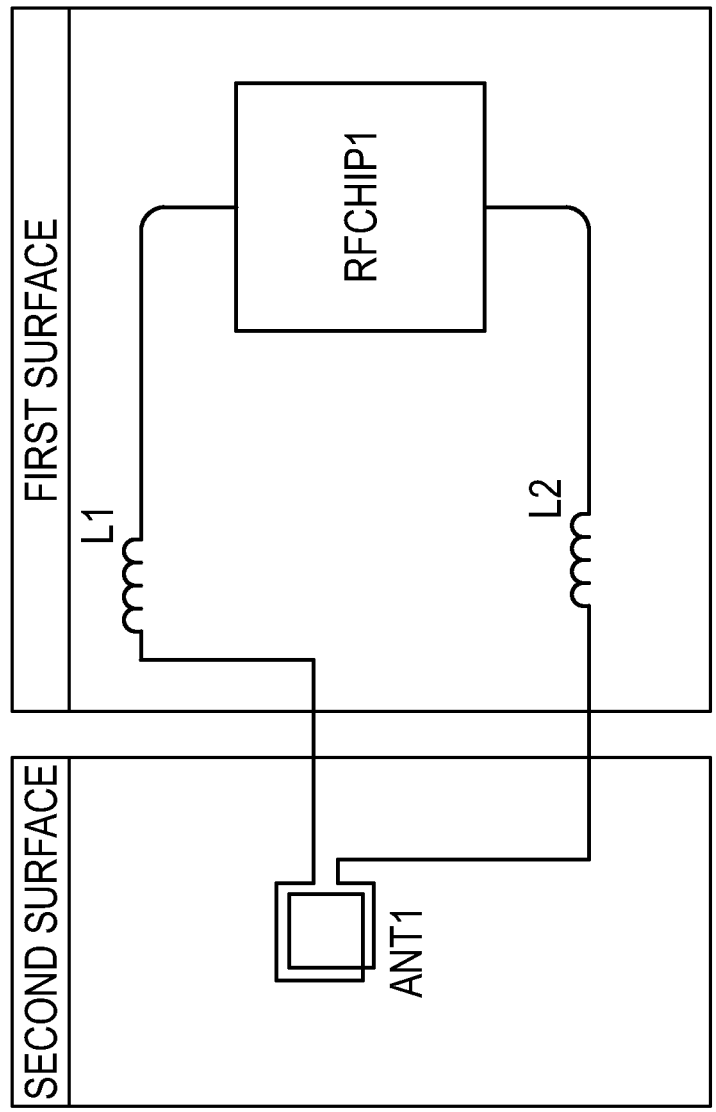
FIG. 7C illustrates an electrical schematic of an embodiment of an RFID tag with a closed-loop multi-layer folded dipole, an RFID chip on a first surface of the RFID tag substrate and a pair of inductors on the first surface of the RFID tag substrate.

In yet another alternative example, and as depicted in FIG. 7C, a matching circuit 112 that includes a pair of inductors L1 and L2 mounted on first surface 103. FIG. 7C is an equivalent circuit diagram to the physical embodiment of RFID tag 300 depicted in FIG. 5B. In this embodiment, the equivalent inductance of inductors L1 and L2 are configured to match the complex impedance of RFID chip 106 and antenna 110. Because the complex portion of the equivalent impedance of RFID chip 108 and antenna 112 may be larger, the use of only matching with inductors can be a cost-effective solution at achieving greater power transfer efficiency.

Figure 7D:
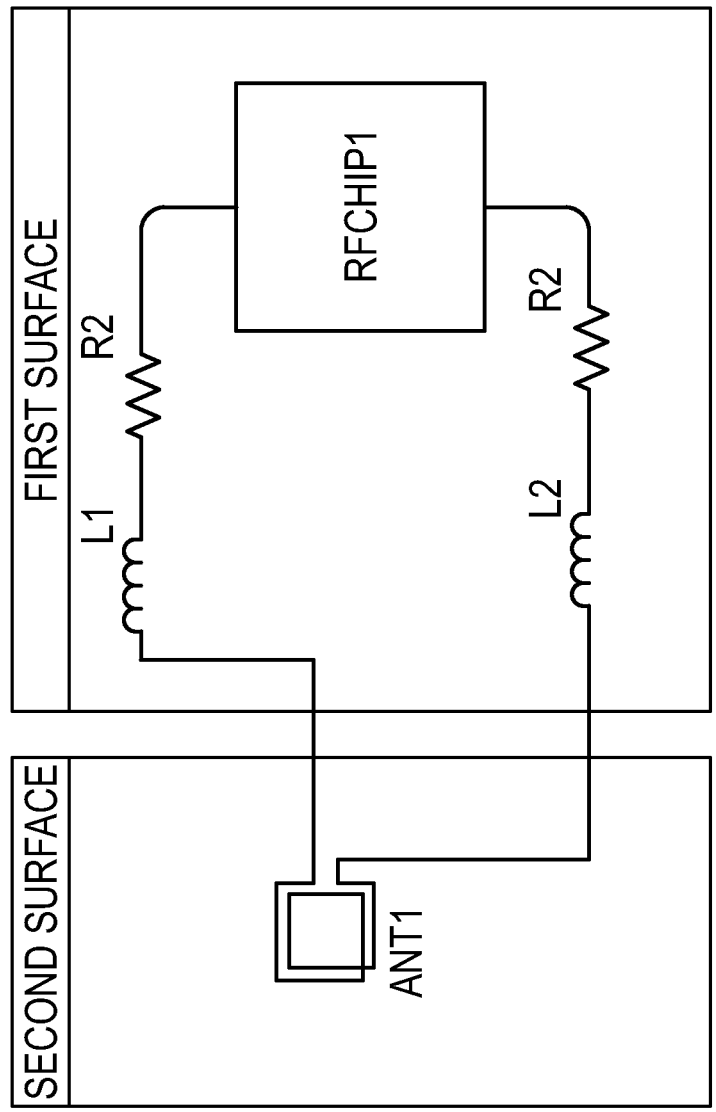
FIG. 7D illustrates an electrical schematic of an embodiment of an RFID tag with a closed-loop multi-layer folded dipole, an RFID chip on a first surface of the RFID tag substrate and a pair of matching circuits on the first surface of the RFID tag substrate.

In another alternative example, and as depicted in FIG. 7D, a matching circuit 112 can include a pair of inductors L1 and L2 and a pair of resistors R1 and R2 mounted on first surface 103. FIG. 7D is an equivalent circuit diagram to the physical embodiment of RFID tag 300 as depicted in FIG. 5B. In this embodiment, the equivalent inductance of inductors L1 and L2 and the equivalent resistance of resistors R1 and R2 are configured to match the impedance of RFID chip 106 and antenna 110. Using a pair of inductors L1 and L2 and a pair of resistors R1 and R2 mounted on first surface 103 allows flow soldering to be applied to a single side, i.e. first surface 103, during the manufacturing process.

In FIG. 8A, for example, an embodiment of a matching circuit 112a includes a resistor 140, an inductor 142, and conductor 144 within a SMD chip. In matching circuit 112a, resistor 140 and inductor 142 are arranged in parallel physical orientation, but conductor 144 is configured to electrically couple resistor 140 and inductor 142 in series. In matching circuit 112b as shown in FIG. 8B, resistor 140 and inductor 142 are arranged in series physical orientation and conductor 144 is configured to electrically couple resistor 140 and inductor 142 in series within a SMD chip. In some embodiments, matching circuits 110 can comprise inductor 142 only, and optionally include a resistor 130, or a capacitor.

Figure 9:
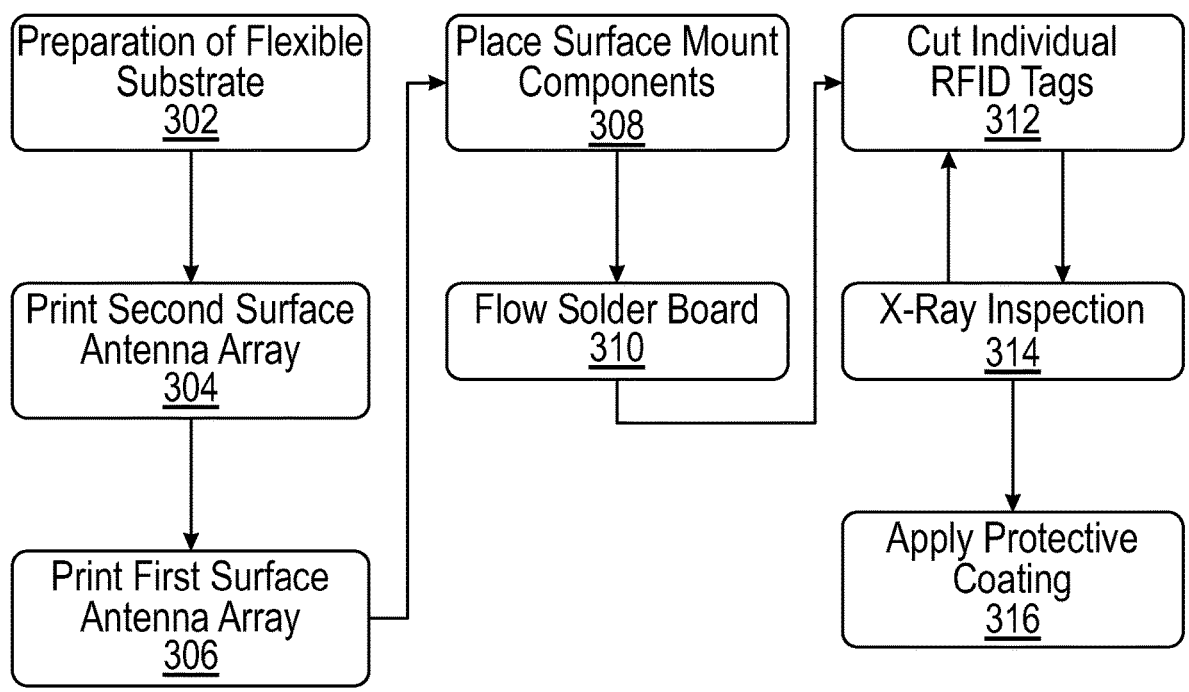
FIG. 9 illustrates a flowchart of the manufacturer and verification steps, according to an embodiment.

In one example of manufacturing RFID tag 100, and as depicted in FIG. 9, RFID tag 100 starts with preparing a sheet of flexible substrate material at 302. Step 302 includes cleaning and preparing flexible substrate sheet that can fit a large array of flexible substrates 102 once cut to size. At step 304, the lower portion of antenna 110, including solder rings 126, is printed in an array patter on one side of the flexible substrate sheet. This side of the flexible substrate sheet will form second surface 104 once each RFID tag 100 is cut to size. At step 306, the flexible substrate sheet is inverted and the upper portion of antenna 110, including rings 126, RFID chip gap 128 and one or more matching circuit gaps 129, is printed in an array pattern on one side of the flexible substrate sheet. This side of the flexible substrate sheet will form first surface 103 once each RFID tag 100 is cut to size.

At this point during the manufacturing process, surface mount components can be placed at step 308. The surface mount components can include RFID chip 106 and matching circuit(s) 112. At step 310, flow solder paste can be placed at coupling points around RFID chip 106 and matching circuit 112. Flow solder paste is also placed at each ring 126. The flexible substrate sheet is then heated to melt the flow solder to form soldered vias for soldered ends 118. Alternatively, flexible substrate sheet can be placed in a vapor phase reflow machine so as to reduce chip exposure to high temperatures.

Figure 10:
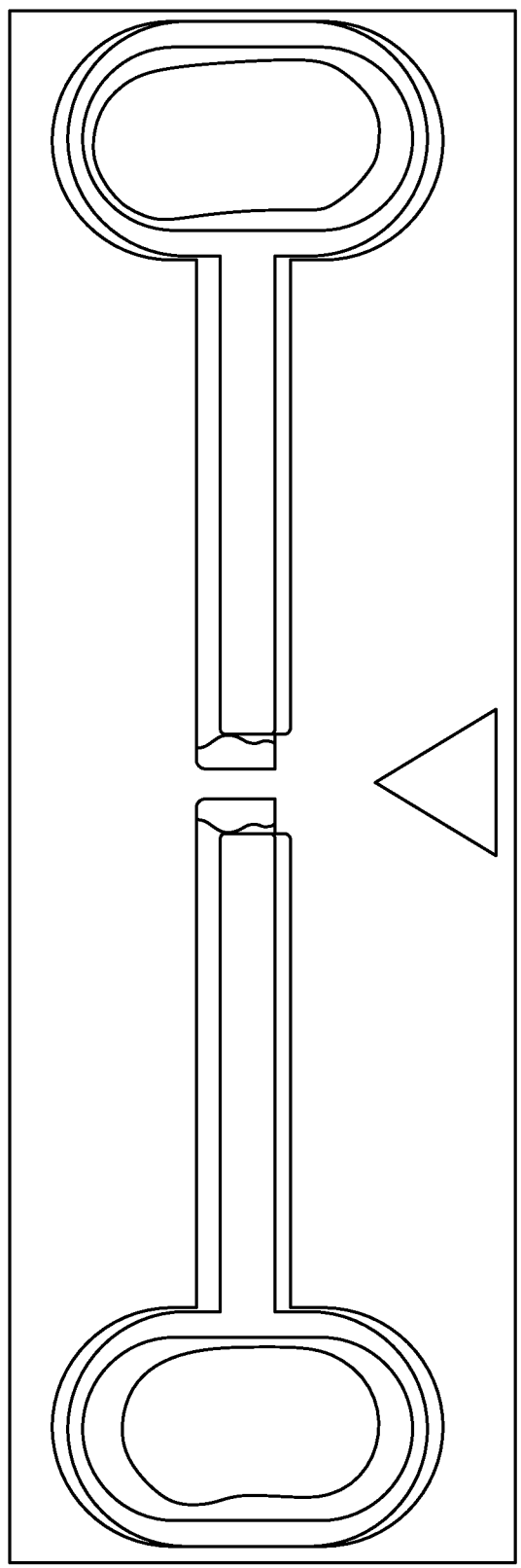
FIG. 10 illustrates an x-ray view of an RFID tag used to confirm alignment of the RFID chip mounting and laser cuts, according to an embodiment.

At step 312, each RFID tag 100 is cut from the flexible substrate sheet using a laser cutter or other cutting precision cutting method. Step 312 can include cutting only the basic envelope of RFID tags 100, including rings 126, or can include laser or die cutting where rings 126 are also trimmed. Prior to cutting, after cutting, or both, RFID tags 100 can be inspected at step 314 to confirm alignment of the RFID chip 106 and matching circuit 112 as well as the integrity of soldered ends 118. FIG. 10 depicts an X-ray inspection that can be performed at step 314 after individual RFID tags 100 are cut, but prior to ring 120 finishing.

At step 316, RFID tag 100 is coated in a protective dielectric coating such as acrylic or chemical vapor deposited polymers. In embodiments, the thickness of the protective coating is important. Enough protective coating is needed to protect RFID chip 100, but the RF transmission and emission qualities can be negatively affected by a protective coating that is too thick. For example, a target Parylene C™ thickness could be between 7.5 um to 25 um. Prior to or immediately after protective coating at 316, an adhesive material 116, such as a Dymax™, can be placed over RFID chip 106 and matching circuit 112 in order to smooth edges of RFID chip 106 and matching circuit 112. The smoothed edges ease insertion of RFID tag 100 and reduce wearing against the tissue of the rodent.

Figure 11A:
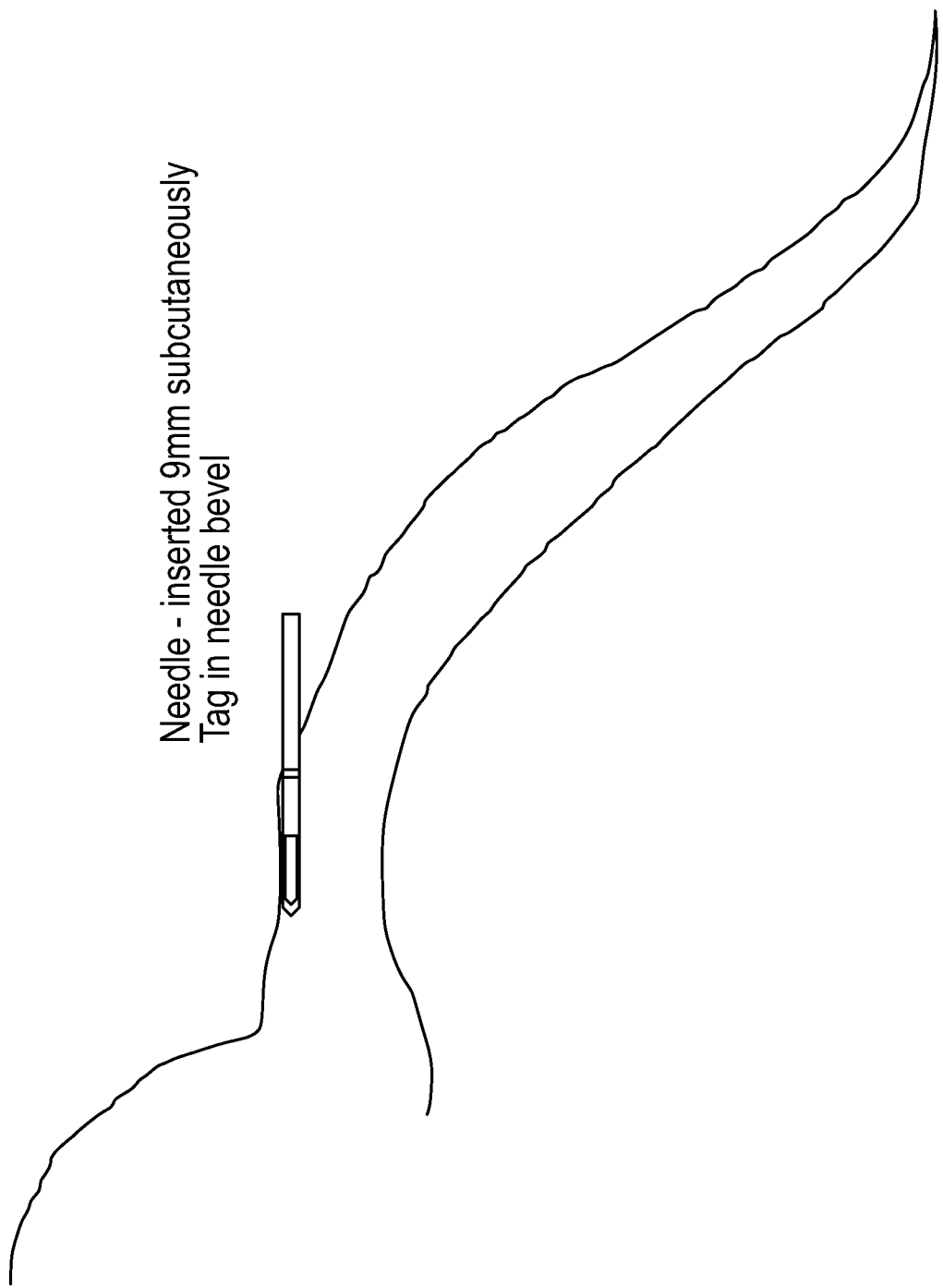
FIG. 11A illustrates a cross-sectional end view of a tail of a rodent showing target locations for possible implantation sites.
Figure 11B:
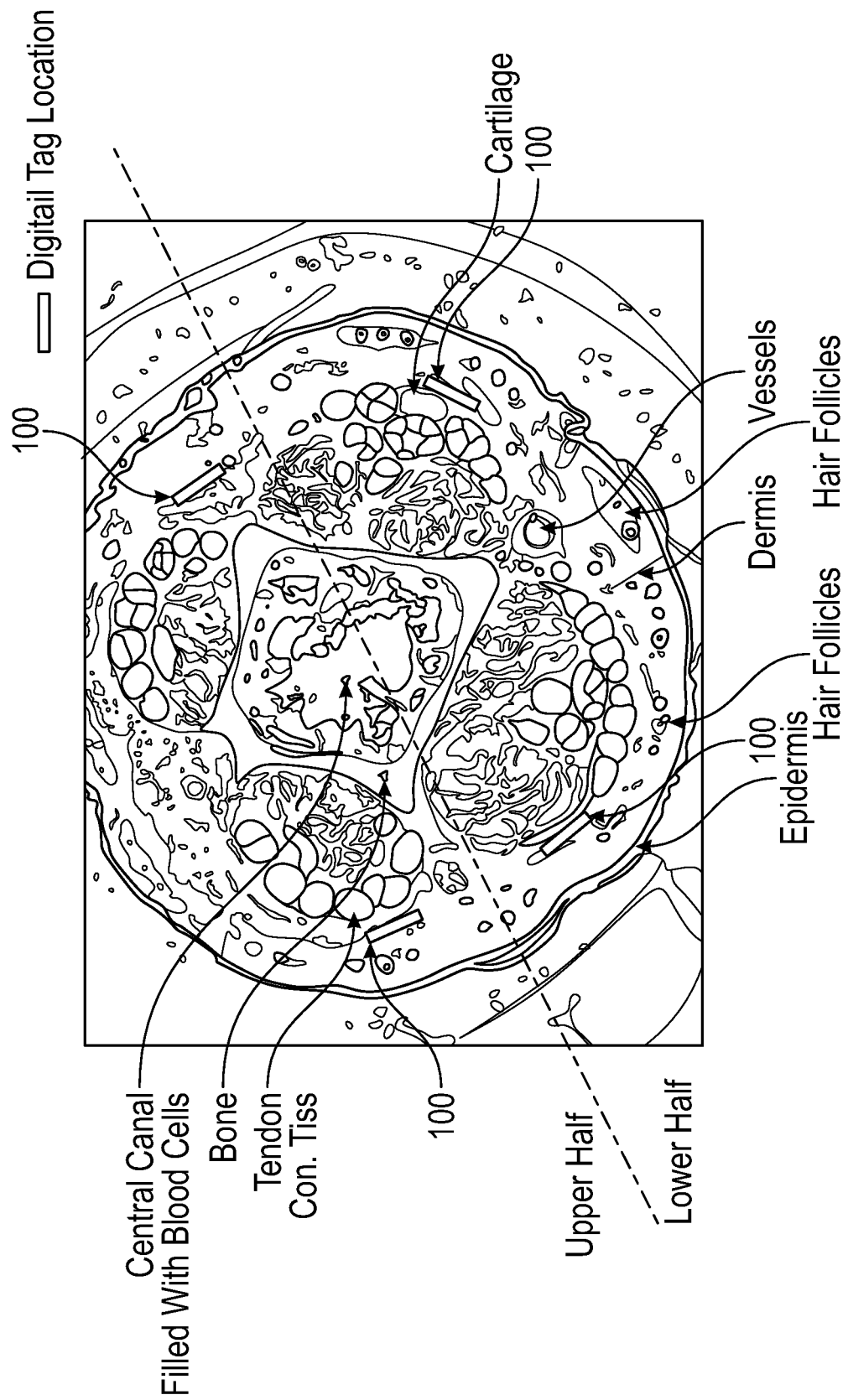
FIG. 11B illustrates a cross-sectional side of a tail of a rodent showing target locations for possible implantation sites.

In use, RFID tag 100 is configured for insertion into a tail of a rodent via needle 120 as shown in FIG. 11A. In embodiments, as depicted in FIG. 11B, RFID tag 100 can be placed within an upper half of the rodent's tail medial to the dermis and hair follicles but lateral to the bone, tendons and muscles. In this position, the physiology of the rodent is relatively unhindered. Further, the flexibility of flexible substrate 102 allows RFID tag 100 to move with the rodent's tail as opposed to restricting the same movement.

Figure 12A:
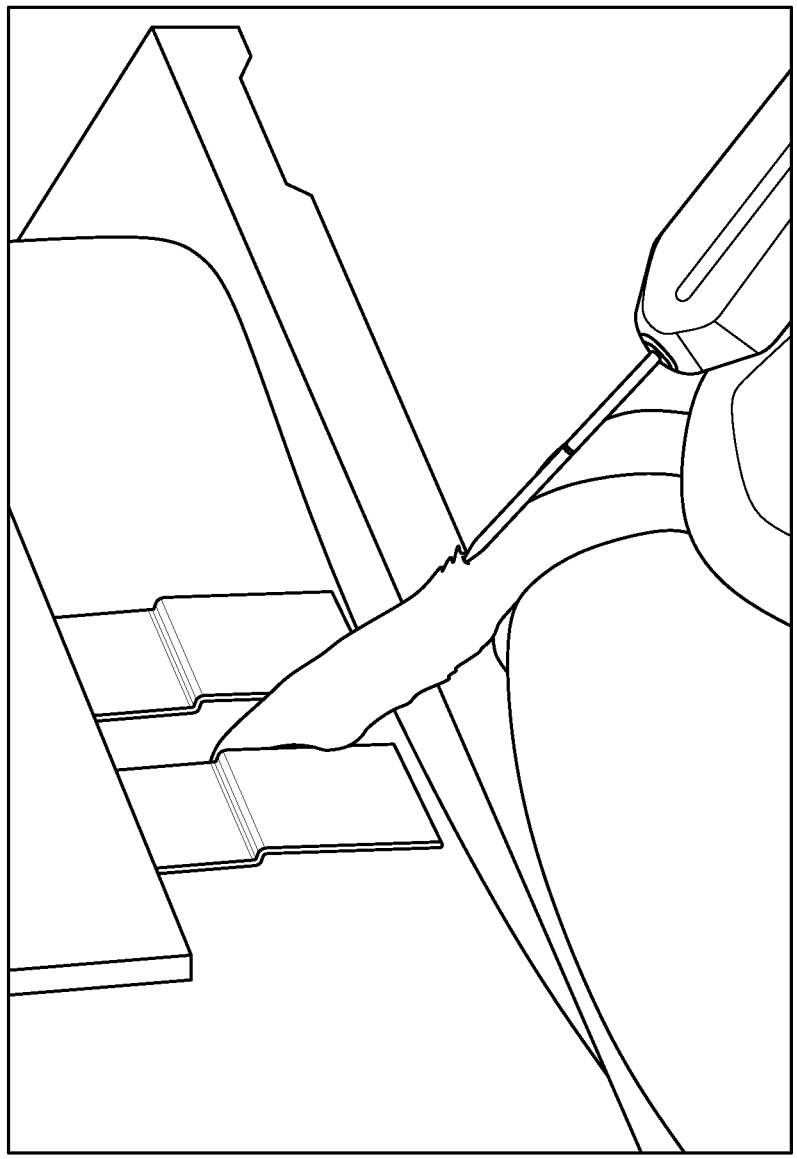
FIGS. 12A-12C are photographs showing a sequence of steps for implantation of an RFID tag in the tail of a rodent using a manual needle injection embodiment.
Figure 12B:
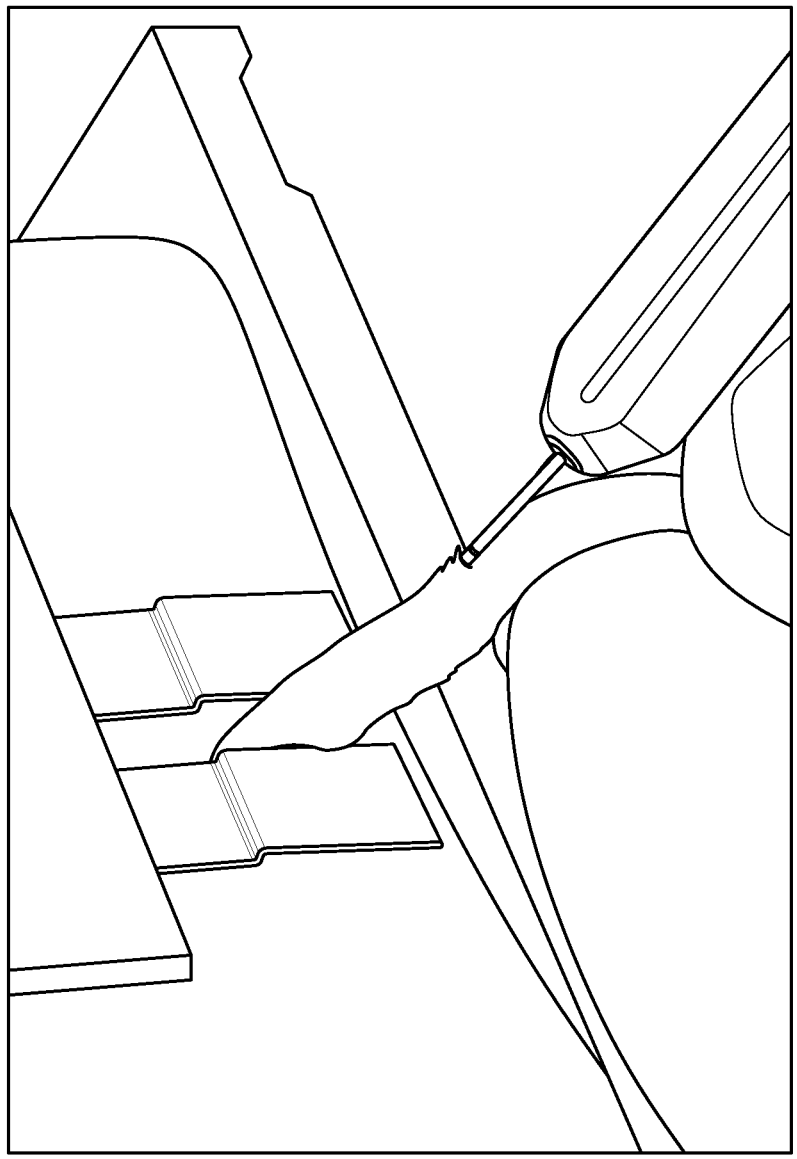
Figure 12C:
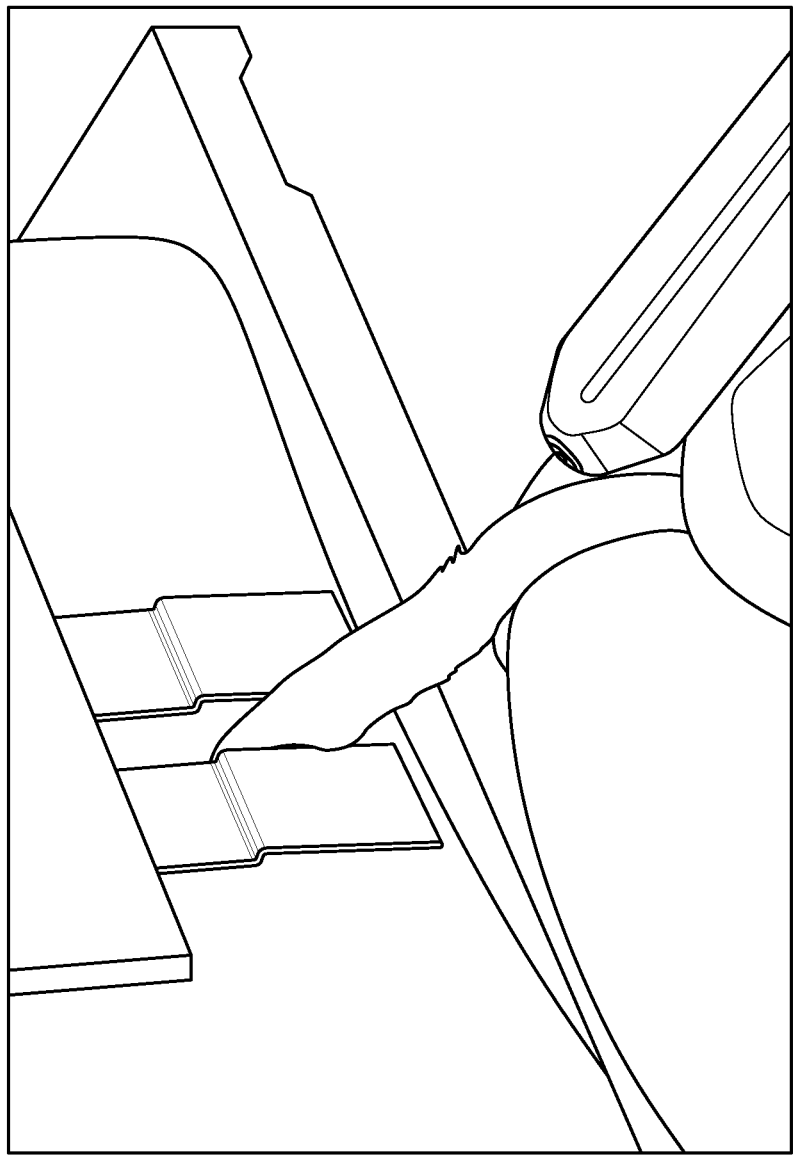

In one embodiment the sequence for manual needle implantation of RFID tag 100 is shown in FIGS. 12A-12C. A tag injector with a 20-22 AWG needle 120 into which the RFID tag 100 is positioned is inserted into the tail of a rodent which is restrained. In embodiments, the needle includes a user-visible mark or indication at a distance of about 1.5 times the length of the RFID tag 100 from the distal tip of the needle 120 as a guide for how far the user should insert the needle. In one embodiment for an RFID tag having a length of 6 mm, the mark is located 9 mm from the distal tip of the needle 120. In embodiments, the mark may be printed, embossed, or etched on the exterior of the needle. In embodiments, the tag injector includes a stop or other structure to temporarily hold the RFID tag 100 in the implanted position within the upper half of the rodent's tail medial to the dermis and hair follicles but lateral to the bone, tendons, and muscles while the needle 120 is withdrawn. Various embodiments of a manual injector for insertion of an RFID tag in accordance with the present disclosure are described in U.S. Prov. Appl. No. 62/571,762, U.S. Publ. No. US2016/0037749 A1 and PCT Publ. No. WO2017/136898 A1, the disclosures of which are each hereby incorporated by reference.

The tables below show the results of an experiment measuring the read range of Unmodified RFAi.D Tag (A), Uninsulated Tag with Inductor (B), Uninsulated Tag with Inductor+Resistor (C), Insulated Tag with Inductor (D), Insulated Tag with Inductor+Resistor (E).

| Tag Characteristics | Modification | Approximate Range |
| --- | --- | --- |
| Somark RFAi.D Tag, Somark Parylene C Insulation | None | No reads |
| Somark RFAi.D Tag, Uninsulated | 20 nH Inductor | 6 mm |
| Somark RFAi.D Tag, Uninsulated | 12 Ω Resistor + 20 nH Inductor | 4 mm |
| Somark RFAi.D Tag, Acrylic Spray Insulation | 20 nH Inductor | 10 mm |
| Somark RFAi.D Tag, Acrylic Spray Insulation | 12 Ω Resistor + 20 nH Inductor | 6 mm |

| Mouse Characteristics | Modification | Approximate Range |
| --- | --- | --- |
| Somark Digital Mouse, Agar Tail, Hollow Body | None | 30 mm |
| Somark Digital Mouse, Agar Tail, Hollow Body | 20 nH Inductor | 85 mm |

Figure 13:
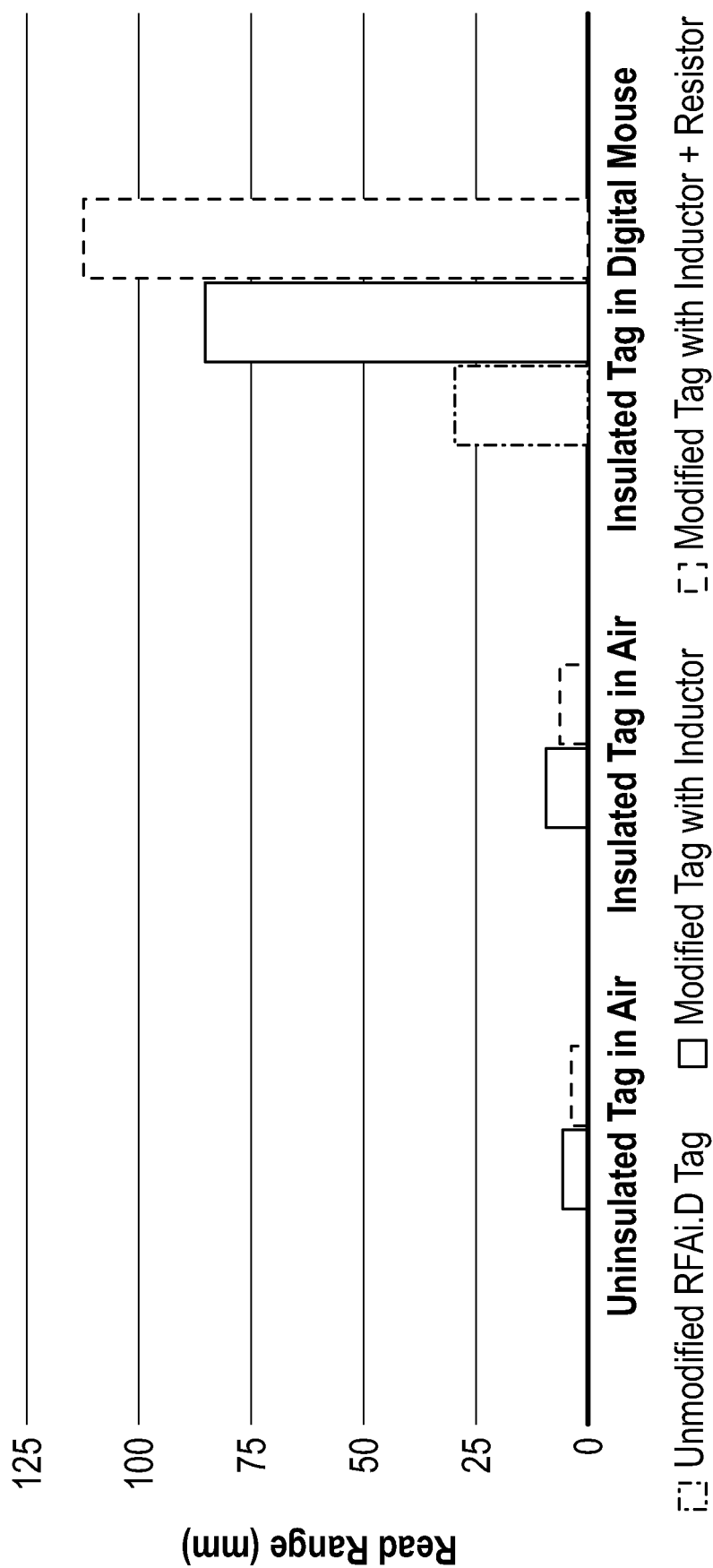
FIG. 13 is a table showing the results of experimentations on read effectiveness with different embodiments of a passive RFID tag implanted in a tail of a rodent.

As shown in the graph illustrated in FIG. 13, the results of this experiment demonstrate that the modified RFAi.D tag with an inductor+resistor combination demonstrated the greatest range (112 mm), followed by 85 mm and finally the unmodified RFAi.D tag at 30 mm. The advantage of using near field magnetic coupling is that it is more resilient to any changes caused by dielectric materials within a 30 cm range.

One potential explanation for the improvement in read range demonstrated in the Table above may be due to the antenna getting closer to the recommended impedance for near field communications. In this experiment, the modified tags were insulated using an acrylic coating similar to the Parylene coating on the unmodified RFAi.D tag tags to avoid any effects that could be caused by the electrical characteristics of agar. The inductors and the resistors used were 0402 components which were available in-house. There are 20 nH inductors with smaller form factors (01005) which are 0.23 mm H×0.20 mm W×0.40 mm L in size as it is generally the physically largest component. Furthermore, the resistor used (10Ω) does not satisfy the required theoretical resistance from the tag chip. Assuming the Kapton substrate of the tag is at the center of the needle that is used to insert the RFAi.D Tag to the mouse tail, a 21.5 AWG needle would provide enough room for a 01005 form factor inductor to fit with the modified tag being within the diameter of a 21 AWG needle.

Persons of ordinary skill in the relevant arts will recognize that embodiments may comprise fewer features than illustrated in any individual embodiment described above. The embodiments described herein are not meant to be an exhaustive presentation of the ways in which the various features of the embodiments may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

The invention claimed is:

1. An improved passive radio frequency identification (RFID) tag, the RFID tag comprised of an elongated flexible substrate having a pair of opposed surfaces with an RFID chip positioned on a first of the opposed surfaces and responsive to radio frequencies in an ultra-high frequency (UHF) band between 860-960 MHz, wherein the improvement comprises:
 a closed-loop multi-layer folded dipole antenna directly electrically connected to the RFID chip and disposed on both of the opposed surfaces of the substrate;
 an inductor having an inductance of 5-50 nH electrically connected to the closed-loop multi-layer folded dipole antenna; and
 a biocompatible insulative coating having a maximum thickness of 25 μm covering the RFID tag,
 such that the RFID tag has a maximum cross-sectional dimension of 1 mm and is configured for implantation in a tail of a rodent using a 20-22 AWG needle and can be read with at least 90 percent effectiveness by a 30 dB RFID tag reader at least 5 cm from the tail of the rodent.

2. The improved RFID tag of claim 1, wherein the elongated flexible substrate is a strip of polyimide material with a pair of opposed ends and having a maximum thickness of 100 μm and a dielectric constant in the range of 2.75-3.5.

3. The improved RFID tag of claim 1, wherein the RFID tag has maximum dimensions of 1 mm wide, 0.5 mm high, and 12 mm long.

4. The improved RFID tag of claim 3, wherein the closed-loop multi-layer folded dipole antenna is formed of a layer of copper deposited on each of the pair of opposed surfaces with an end of each layer proximate one of the pair of opposed ends of the strip soldered together and terminated to form an electrical connection between the layers of copper on the pair opposed surfaces.

5. The improved RFID tag of claim 4, wherein each conductive layer covers substantially all of an exposed portion of the opposed surface other than a first gap for mounting the RFID chip and at least a second gap for mounting the inductor.

6. The improved RFID tag of claim 4, wherein each conductive layer includes at least one strip of conductive material configured as a split antenna portion on at least one of the opposed surfaces.

7. The improved RFID tag of claim 4, wherein each conductive layer includes at least one strip of conductive material configured as a meander antenna portion on a least one of the opposed surfaces.

8. The improved RFID tag of claim 4, wherein the RFID chip is secured to the first of the opposed surfaces by both solder pads under the RFID chip and an ultraviolet adhesive on top of at least a portion of the RFID chip.

9. The improved RFID tag of claim 8, wherein the elongated flexible substrate is configured to form a curved arc between the pair of opposed ends of the substrate up to a 45 degree arc angle with less than a ten percent failure rate of the RFID tag.

10. The improved RFID tag of claim 1, wherein the inductor is part of an antenna matching circuit that has an equivalent resistance of less than 50 ohms electrically connected to the closed-loop multi-layer folded dipole antenna.

11. The improved RFID tag of claim 10, wherein the antenna matching circuit includes:
 a first equivalent inductance and a first equivalent resistance configured as one or more surface mount devices mounted on a first half of the first surface of the substrate and electrically connected to a first dipole of the closed-loop multi-layer folded dipole antenna; and
 a second equivalent inductance and a second equivalent resistance configured as a one or more surface mount devices mounted on a second half of the first surface of the substrate and electrically connected to a second dipole of the closed-loop multi-layer folded dipole antenna.

12. The improved RFID tag of claim 10, wherein the antenna matching circuit comprises an equivalent inductance and an equivalent resistance configured as one or more surface mount devices, at least one of which is mounted on the second surface of the substrate and electrically connected to a dipole of the closed-loop multi-layer folded dipole.

13. The improved RFID tag of claim 10, wherein the antenna matching circuit comprises a first equivalent inductance and a first equivalent resistance configured as a surface mount device mounted on the second surface of the substrate and electrically connected to a dipole of the closed-loop multi-layer folded dipole.

14. A method of forming an improved passive radio frequency identification (RFID) tag configured for implantation in a tail of a rodent using a 20-22 AWG needle, the method comprising:
 providing a sheet of a flexible substrate having a pair of opposed surfaces;
 printing an array of corresponding antenna elements on each of the pair of opposed surfaces, each antenna element configured as an elongated element having a width with opposed ends each having a solder ring wider than the width, wherein each of a set of corresponding antenna elements on the pair of opposed surfaces are configured to be one layer of a closed-loop multi-layer folded dipole antenna;
 surface mounting an RFID chip on one of the pair of the opposed surfaces for each set of corresponding antenna elements, the RFID chip being responsive to radio frequencies in an ultra-high frequency (UHF) band between 860-960 MHz;
 surface mounting one or more antenna matching circuit components on one or more of the pair of the opposed surfaces for each set of corresponding antenna elements, the antenna matching circuit components including an inductor having an inductance of 5-50 nH;
 flow soldering at least one of the pair of opposed surface of the flexible substrate to electrically connect the RFID chip and the antenna matching circuit components of each set of corresponding antenna elements to the corresponding antenna elements;

creating an individual RFID tag from each set of corresponding antenna elements by cutting the individual RFID tags out of the flexible substrate such that the corresponding solder rings at each of the opposed ends of the individual RFID tag electrically connect the antenna elements on the pair of opposed surfaces of the individual RFID tag to form the closed-loop multi-layer folded dipole antenna;

coating the individual RFID tags with a biocompatible insulative coating having a maximum thickness of 25 µm, such that the RFID tag has a maximum cross-sectional dimension of 1 mm and can be read with at least 90 percent effectiveness by a 30 dB RFID tag reader at least 5 cm from the tail of the rodent.

15. The method of claim 14, further comprising using an adhesive to further secure the RFID chip and the antenna matching circuit components to the at least one of the pair of opposed surfaces after the flow soldering and before creating the individual RFID tags.

\* \* \* \* \*